Feb. 23, 1954 K. H. HOHENEMSER 2,670,051
AIRCRAFT LIFTING ROTOR AND PITCH
CONTROL MECHANISM THEREFOR
Filed July 18, 1949 3 Sheets-Sheet 1

INVENTOR.

Kurt H. Hohenemser.

Feb. 23, 1954  K. H. HOHENEMSER  2,670,051
AIRCRAFT LIFTING ROTOR AND PITCH
CONTROL MECHANISM THEREFOR

Filed July 18, 1949  3 Sheets-Sheet 2

INVENTOR.
Kurt H. Hohenemser.

Feb. 23, 1954 K. H. HOHENEMSER 2,670,051
AIRCRAFT LIFTING ROTOR AND PITCH
CONTROL MECHANISM THEREFOR
Filed July 18, 1949 3 Sheets-Sheet 3

INVENTOR.
Kurt H. Hohenemser.

Patented Feb. 23, 1954

2,670,051

UNITED STATES PATENT OFFICE 2,670,051

AIRCRAFT LIFTING ROTOR AND PITCH CONTROL MECHANISM THEREFOR

Kurt H. Hohenemser, Pattonville, Mo.

Application July 18, 1949, Serial No. 105,329

7 Claims. (Cl. 170—160.25)

This invention relates generally to airscrews, and more particularly to lifting rotors for aircraft.

Rotors of this type consist of a plurality of rotary wings or blades connected to a rotating hub, and they are arranged to rotate in a substantially horizontal plane above the fuselage of the aircraft so as to carry its weight. While an airplane requires a certain minimum forward flight speed in order to stay in the air, a rotary wing aircraft is capable of vertical flight.

The present invention is applicable to all types of rotary wing aircraft including the helicopter where the lifting rotor provides both lift and propulsive force, the gyrodyne where separate means of propulsion provide the propulsive force, the compound rotary-fixed wing aircraft where part of the lift in forward flight is provided by a non-rotating lifting surface and the convertible aircraft which is capable of being converted in the air from a rotary wing aircraft into an airplane.

Lifting rotors for aircraft are conventionally driven by engines located in the fuselage and connected to the rotor by transmission gears and shafts, or they may be driven by propulsion means located on each of the rotary wings, or they are driven like a windmill by the relative airflow acting on the aircraft in forward flight.

In order to carry the weight of the aircraft in vertical flight lifting rotors are required having diameters which are several times greater than the diameters of propulsion airscrews for the same size of aircraft. Because of the tremendous gyroscopic moments acting on such large rigid airscrews during maneuvers of the aircraft it is standard practice to use hinged lifting rotors where the rotary wings are free to flap vertically up and down.

Hinged lifting rotors however, show a pronounced instability in forward flight which is increased with increasing flight speed and which requires, if not compensated, appreciable skill and constant attention by the pilot.

A further disadvantage of the hinged lifting rotor is its tendency of rotary wing stall especially during pull-up maneuvers. Wing stall occurs when a certain upper limit of the angle of attack of the wings is reached and produces a sudden decrease of lift and a sudden increase in drag of the wings. For an airplane the danger of wing stall is present at low speed flight. For an aircraft with hinged lifting rotors theory and flight experience indicate increasing danger of rotary wing stall with increasing flight speed. Rotary wing stall causes a reduction and in severe cases a complete loss of controllability of the aircraft and at the same time heavy vibrations.

Another disadvantage of the conventional lifting rotor is the failure of the rotor to continue rotation and to provide the required lift after the driving engines have ceased to operate due to lack of fuel or other failure. Hence, in most rotary wing aircraft the pitch angle of the rotary wings must be reduced by the pilot by actuating the rotor pitch control in order to secure continued rotation of the lifting rotor in power-off flight. At a sufficiently low pitch angle of the rotary wings rotation is sustained by the relative airflow acting on the aircraft in a manner similar to the operation of a windmill. If, however, the pilot fails to reduce the rotary wing pitch angle in case of discontinued engine operation in the air the lifting rotor ceases to turn and to provide lift, and the aircraft is bound to crash if the rotor is the only lifting device.

In view of the generally known unsatisfactory stability characteristics of the hinged lifting rotor numerous stabilizing devices have previously been proposed. The use of such devices, in most cases, has undesirable secondary effects, quite apart from their additional weight and the complication of the construction caused thereby. This is true even of the simplest of stabilizing devices, the stabilizing tail surface, and in this case the detrimental effects have their origin in the very powerful turbulent wake of the rotor.

Several proposals have been made for improving the unsatisfactory characteristics of the hinged lifting rotor whereby the rotor hub and hinge assembly of a conventional lifting rotor is modified in such a manner as to effect the type of kinematic relation between flapping angle and pitch angle of each rotary wing or between the flapping angles and pitch angles of certain combinations of several rotary wings of a lifting rotor. When these proposals were made, however, little was known about the essential parameters affecting the stability of a rotary wing aircraft, and it may be demonstrated by the theory of rotary wing flight stability, only recently developed, that neither of the previously proposed improvements of lifting rotors eliminates the undesirable stability characteristics of this rotor type.

The principal object of the present invention is to provide an inherently stable lifting rotor so that the aircraft will be stable without the necessity of incorporating additional stabilizing devices with their disadvantages whereby increasing stability is provided with increasing flight speed.

A further object of the invention is to provide a lifting rotor which will eliminate or reduce rotary wing stall.

Another object of the invention is to provide a lifting rotor which will windmill after discontinued engine operation in the air without requiring adjustment of the rotor pitch control.

The present invention relates more specifically to the type of lifting rotor where kinematic relations exist between the flapping angles and pitch angles of certain combinations of several rotary wings of a lifting motor. In accordance with the present invention the construction of the rotor hub and hinge assembly of this type of lifting rotor is modified in such a manner as to obtain the kinematic relation between the pitch angles and the flapping angles of the rotary wings required for an inherently stable rotor.

The invention will appear more clearly from the following detailed description taken in connection with the accompanying drawings, showing by way of example, preferred embodiments of the invention.

Fig. 1 is a partly schematic side view of a helicopter having an engine inside the fuselage and with a tail rotor provided for the purpose of compensating the torque reaction of the main rotor on the fuselage. The blades are shown in two positions illustrating "cyclic flapping," a mode of flapping which will be explained hereafter.

Fig. 2 is a partly schemaic side view of a helicopter with jet engines at the tip of the rotary wings. No tail rotor is necessary in this case since there is no torque reaction of the rotor on the fuselage. The blades are shown in two positions illustrating "collective flapping," a mode of flapping which will also be explained hereafter.

Figure 1:
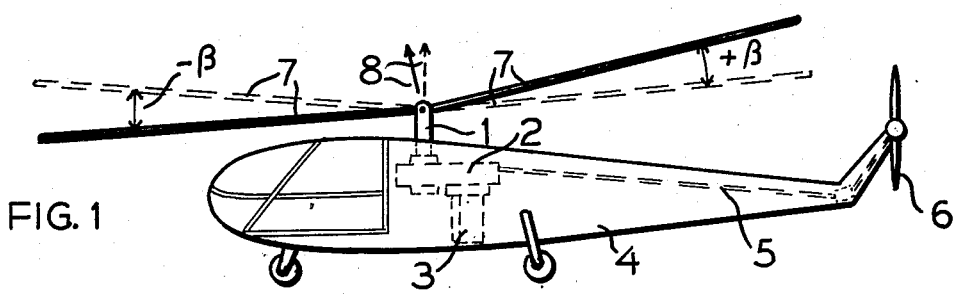

Referring now to the drawings in which like elements are designated by the same reference characters throughout all the figures and particularly to Fig. 1, there is illustrated one of the aircraft types to which the invention may be applied. The helicopter shown is provided with a single gear driven lifting rotor and with a torque compensating tail rotor. The rotor shaft 1 is driven by gears arranged in the gear case 2, the power being provided by an engine 3. Gear case 2 and engine 3 are located inside the fuselage 4 of the helicopter. A transmission system 5 transmits power to the tail rotor 6, which serves to counteract the torque reaction of the lifting rotor on the fuselage 4. The blades 7 are hinged to the rotor shaft 1 and are free to flap vertically up and down. The blades 7 are shown in dotted lines in their mean position. In this position the swept surface of the blades during rotation forms a slight cone. The resultant rotor force is represented by a dotted vector 8.

The blades 7 are shown in solid lines in a position corresponding to a forward inclination of the rotor. Seen from a point of observation outside the rotor the rotor cone is tilted forward by the angle $\beta$ and the vector 8 of the resultant rotor force is inclined forward by the same angle. Seen from a point of observation which rotates with the rotor the blades flap up and down periodically. If the longitudinal axis of a blade points rearward the flapping angle relative to the mean position is $+\beta$ (upward). During rotation of the blade from its rearward position in a clockwise direction seen from below the flapping angle $\beta$ is decreased first to 0 in the right sideward position of the blade and then to $-\beta$ (downward) in the forward position of the blade. In the further course of the rotation the blade flapping angle goes again through zero in the left sideward position, where the cycle is completed. This kind of flapping motion will be called "cyclic flapping." Seen from a non-rotating point of observation the cyclic flapping motion of the blades with the amplitude $\beta$ appears as an inclination of the rotor cone with respect to the mean position by the angle $\beta$.

Figure 2:
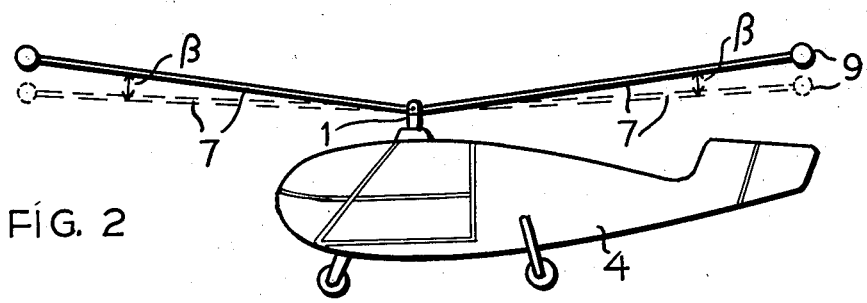

Fig. 2 illustrates another type of aircraft to which the invention may be applied. The helicopter of Fig. 2 has a single jet-driven lifting rotor. The center part 1 of the lifting rotor is either a rotating shaft supported by bearings in the fulselage 4, or it is a non-rotating structural member which carries at its upper end a bearing to support the hub of the lifting rotor. The blades 7 are again hinged at the rotor center and are free to flap up and down. They carry at their outer ends jet engines 9. The dotted lines represent the mean position of the blades 7. The solid lines represent a position of the blades 7 where the flapping angle $\beta$ of all blades is increased by the same amount. This happens for example when the rotational speed of the rotor is reduced while the rotor lift is kept constant, or when the rotor lift is increased while the rotational speed is kept constant. A flapping motion where the flapping angles of all blades vary by the same amount will be called "collective flapping." For the purpose of this specification the total flapping motion of the blades will be assumed to consist of only two portions: collective flapping and cyclic flapping. Actually small flapping oscillations with higher frequencies may occur in addition to these two main flapping modes, but these high frequency oscillations are insignificant for the stability and control characteristics of the aircraft and they are irrelevant for an understanding of the invention.

Figure 3:
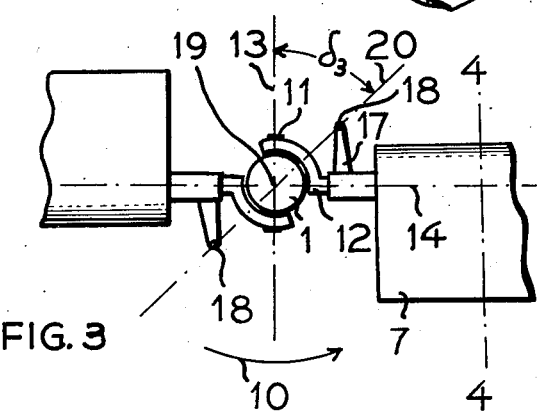
Fig. 3 is a plan view of the rotor hub and hinge assembly of a rotor type airscrew where the pitch angle of a rotary wing is increased when the wing flaps in the downward direction.
Figure 4:
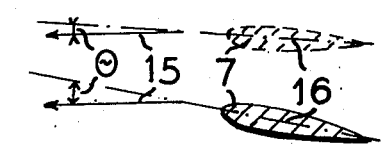
Fig. 4 is a cross section through the wing of Fig. 3 taken on line 4—4 of Fig. 3. The cross section is shown in two positions in order to illustrate the change of blade pitch angle with the flapping motion.

Figs. 3 and 4 illustrate the kinematic relation between the flapping angle and the pitch angle of a blade. The direction of rotation of the rotor 7 is indicated by arrow 10. Links 12 are connected to the rotor shaft by means of flapping hinges 11 so as to allow rotation of the links 12 about the axis 13. The blades 7 are rotatably connected to the links 12 so that they may rotate about the longitudinal blade axis 14 thereby changing the blade pitch angle $\theta$ (Fig. 4). This angle is defined as the angle between the direction 15 of rotational speed of the blade and the chord axis 16 of the blade section as illustrated in Fig. 4.

The blades carry control horns 17 having points of attachment 18 for blade pitch control. Moving the points 18 in a vertical direction changes the blade pitch angle $\theta$. Collective pitch control is achieved by moving both points 18 simultaneously and by the same amount in the vertical direction. Cyclic pitch control is achieved by oscillating the points 18 vertically in opposite direction so that one point 18 goes up when the other point 18 goes down. It is not necessary for an understanding of the present invention to describe the complicated mechanism required to provide rotor pitch control. In order to avoid confusion the process of rotor pitch control will be disregarded and it will be assumed that the points 18 are vertically fixed. This condition is fulfilled in the neutral position of the cyclic pitch control system.

When the blades 7 are rotated about their longitudinal axis 14 or when they flap about their hinge axis 13, the intersection point 19 of the two axes 14 and 13 is fixed in space. Under the assumption outlined above the point 18 is the second point of the blade 7 which is vertically fixed, so that the blade 7 is only free to rotate about the axis 20 through the two points 18 and 19. This axis 20 is called the virtual blade flapping axis. The angle between the axes 20 and 13 is called $\delta_3$, and the kinematic relation between the increase in flapping angle $\Delta\beta$ and the decrease in blade pitch angle $\Delta\theta$ is given by the equation $$\Delta\theta = \Delta\beta \tan \delta_3$$

For $\delta_3 = 0$ blade flapping motions have no influence on the blade pitch angle. For a $\delta_3$ angle somewhat below 90° there is a large decrease in pitch angle with increased flapping angle. Fig. 4 shows two positions of the blade sections 4—4. At the higher position (dotted lines) the pitch angle $\theta$ is reduced compared with that in the lower position (solid lines).

All the lifting rotor arrangements shown in Figs. 1 to 4 are known and these figures were only included in order to illustrate the meaning of the terms which will be used in describing the invention and to provide a better understanding thereof.

Figure 5:
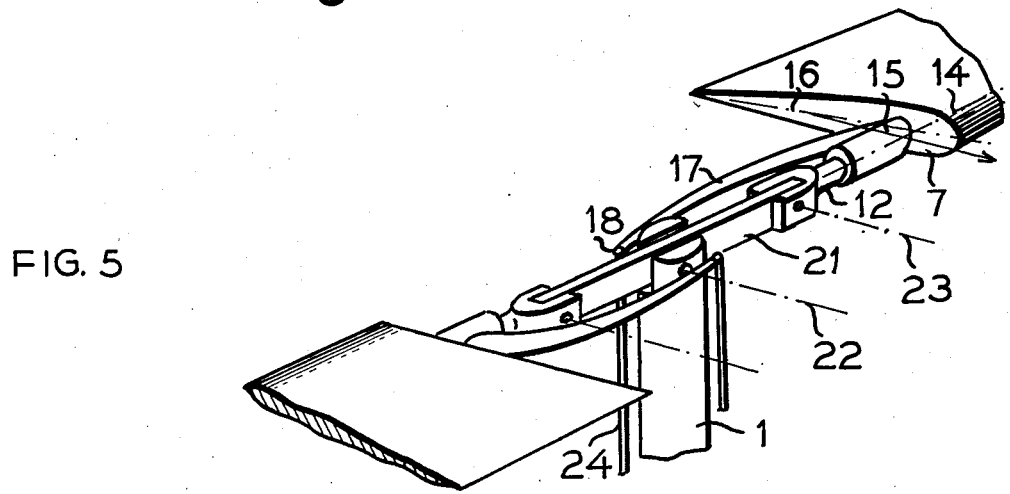
Fig. 5 is a perspective view of the rotor hub and hinge assembly of a lifting rotor showing the preferred embodiment of the invention for a two bladed rotor.

Fig. 5 illustrates the hub and hinge assembly of a rotor in accordance with the preferred embodiment of the invention. A walking beam 21 is hinged in its center to the upper end of the rotor shaft 1, thereby allowing a free vertical see-saw motion of the walking beam about the axis 22. Links 12 are hinged to the ends of the walking beam 21 so as to allow rotation of the links 12 about the axis 23. Blades 7 are rotatably connected to the links 12 by means of a pitch varying pivot so that they may rotate about their longitudinal axes 14 thereby changing their pitch angle $\theta$. The blades carry control horns 17 having points of attachment 18 for the vertical pushrods 24. The pushrods 24 are, for the purpose of rotor pitch control, moved in the vertical direction, as is well known.

As has been explained before the rotor pitch control will be disregarded since it does not contribute to an understanding of the invention, and it will be assumed that the pushrods 24 are vertically fixed. The blade pitch control of the rotor according to the invention is not different from the blade pitch control of a conventional rotor so that a description of the control mechanism is not deemed to be necessary.

For a cyclic flapping motion opposite blades flap in opposite directions. For this type of motion the walking beam 21 rocks about the axis 22, but no motion takes place about the outer axes 23.

For a collective flapping motion opposite blades flap in the same direction. For this type of motion the links 12 rock about the axes 23, but no motion takes place about the center axis 22 of the walking beam 21. The member 21 will also be referred to as a hub like member or as a tip path plane follower since during rotation of the rotor it assumes a position parallel to the plane defined by the path of the blade tips.

Figure 6:
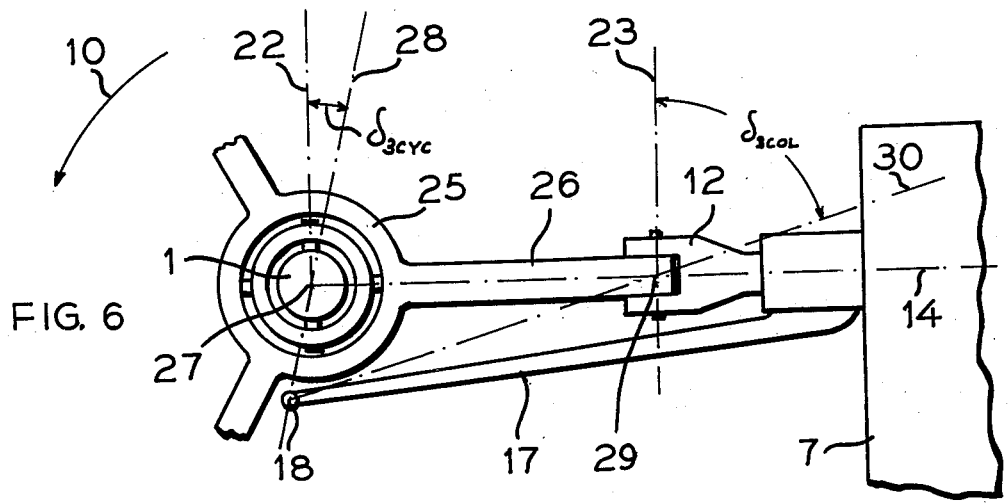
Fig. 6 is a plan view of the rotor hub and hinge assembly of a lifting rotor showing the preferred embodiment of the invention for a three bladed rotor.

The location of the different axes is more clearly illustrated in Fig. 6. The fact that this drawing shows a three bladed rotor does not change the kinematic relations. Only one of the three blades is illustrated and the direction of rotation of the rotor is indicated by the arrow 10. Instead of the walking beam 21 of Fig. 5 a hub 25 with three arms 26 is provided. The hub 25 is universally hinged to the rotor shaft 1 as shown. Links 12, blade 7 and control arm 17 are the same as described before and illustrated in Fig. 5. For the same reason as explained before the hub 25 will be also referred to as a tip path plane follower.

For a cyclic flapping motion of the blade 7 the hub 25 rocks about the axis 22, but no motion takes place about the outer axes 23. For a collective flapping motion the links 12 rock about the axes 23, but no motion takes place about the center of the hub 25. The points 18 are again assumed to be fixed in the vertical direction.

In case of cyclic flapping the center point 27 of the axis 22 is the second fixed point of the blade 7 and the blade is only free to move about the axis 28 which will be called the cyclic flapping axis and which passes through points 27 and 18. The angle between the axes 22 and 28 is called $\delta_{3\,cyc}$ and the kinematic relation between the change in cyclic flapping angle $\Delta\beta_{cyc}$ and the corresponding change in blade pitch angle $\Delta\theta_{cyc}$ is given by the equation $$\Delta\theta_{cyc} = \Delta\beta_{cyc} \tan \delta_{3\,cyc}$$

A change in cyclic flapping angle $\Delta\beta_{cyc}$ produces a change in blade pitch angle $\Delta\theta_{cyc}$ which is appreciably smaller than the cyclic flapping angle $\Delta\beta_{cyc}$.

In case of collective flapping the center point 29 of the axis 23 is the second fixed point of the blade 7 and the blade is only free to move about the axis 30 which will be called the collective flapping axis and which passes through points 13 and 29. The angle between the axes 23 and 30 is called $\delta_{3\,col}$ and the kinematic relation between the increase is collective flapping angle $\Delta\beta_{col}$ and the corresponding decrease in blade pitch angle $\Delta\theta_{col}$ is given by the equation $$\Delta\theta_{col} = \Delta\beta_{col} \tan \delta_{3\,col}$$

An increase in collective flapping angle $\Delta\beta_{col}$ produces a decrease in blade pitch angle $\Delta\theta_{col}$ which is appreciably larger than the collective flapping angle $\Delta\beta_{col}$.

It is to be understood that the correct proof for the effectiveness of the rotor of the invention may only be given with the help of mathematical equations in combination with experimental data. I have carried out a detailed mathematical investigation of the lifting rotor of the invention and the results of this investigation prove quantitatively the correctness of the following conclusions which are based on qualitative considerations only in order to avoid confusion.

A conventional hinged rotor with zero $\delta_3$ angle has in forward level flight, when the lifting rotor is power driven, the following main stability characteristics:

1. An increase in forward flight speed produces a cyclic flapping of the blades equivalent to a backward inclination of the rotor cone and of the resultant force vector 8 in Fig. 1, thereby causing a nose-up moment acting on the aircraft. In other words the hinged lifting rotor resists an increase in flight speed which means, it produces a stabilizing moment when the flight speed is changed. This is a desirable property of the rotor.

2. A slow nose-up motion of the aircraft produces a cyclic flapping of the blades equivalent to a backward inclination of the rotor cone and of the resultant force vector 8 in Fig. 1, thereby causing a further nose-up moment acting on the aircraft. In other words, the hinged lifting rotor produces an instabilizing moment, when the attitude of the aircraft is changed. This is a very undesirable property of the rotor.

3. A fast nose-up motion of the aircraft with a certain angular speed produces a cyclic flapping of the blades equivalent to a forward inclination of the rotor cone and of the resultant force vector 8 in Fig. 1 proportional to the angular speed. In other words, the hinged lifting rotor produces a damping moment when the attitude of the aircraft is changed proportional to the rate of change of attitude. This is a desirable property of the rotor.

It would be possible to avoid the instability with changes of attitude of the aircraft if the $\delta_3$ angle of the conventional rotor would be increased to a value somewhat below 90°. In such a rotor cyclic flapping would be almost entirely suppressed. There would be no instability with attitude changes of the aircraft, but there would also be no stability with speed changes and there would be no damping with rate of attitude changes of the aircraft. The desirable properties would be eliminated together with the undesirable properties.

The rotor according to the invention, however, retains all those properties of the conventional rotor with zero or small $\delta_3$ angle where cyclic flapping only is involved, because with the rotor according to the invention cyclic flapping produces only small changes in blade pitch angles. Since the stability with speed and the damping with rate of attitude changes of the aircraft both involve substantially cyclic flapping only these two properties are for the rotor according to the invention of the same order of magnitude as for the conventional rotor with zero or small $\delta_3$ angle. As to the desirable amount of the $\delta_{3cyc}$ angle theoretical considerations indicate that probably best results will be obtained with a $\delta_{3\,cyc}$ angle between 15° and 30°, depending on the type of blades.

The second of the above mentioned three rotor characteristics is fundamentally changed for the rotor according to the invention. Instead of being instable with respect to attitude changes of the aircraft, the rotor according to the invention is stable in the whole flight range. The qualitative explanation for this stability is as follows. The backward inclination of the rotor cone and of the resultant force vector 8 increases in forward flight with increasing blade pitch angle $\theta$ or, in other words, a decrease in blade pitch angle $\theta$ produces a forward inclination of the rotor cone. When changing the attitude of the aircraft by a nose-up motion, the lift on the rotor becomes larger, consequently the blades increase their collective flapping angle, which produces in the rotor according to the invention an appreciable reduction in blade pitch angle $\theta$. The forward inclination of the rotor cone and of the resultant force vector 8 accompanying this reduction in blade pitch angle $\theta$, overcompensates the natural tendency of the rotor cone to incline backward because of the nose-up motion and the displacement of the resultant force vector 8 is a forward inclination producing a stabilizing moment.

A second very undesirable phenomenon of the conventional lifting rotor is its sensitivity to stall of the rotating wings, especially in pull-up maneuvers, when the resultant rotor force vector 8 in Fig. 1 is increased above the normal value. The rotor according to the invention responds to every increase of rotor force vector 8, because it is accompanied by a collective upward flapping of the blades, with a marked reduction in blade pitch angle $\theta$ and, therefore, the stall limit is shifted out of the normal operational range of the rotor.

The fulfilment of the third of the objects of the invention, the provision of windmilling in power-off flight without adjustment of blade pitch control, is obvious. As soon as the angular speed of the rotor drops because of reduction or cut-off of the driving power the blades flap upwards in unison and a reduction in blade pitch angle occurs which is sufficient to keep up the rotation at a slightly reduced angular speed.

Figure 7:
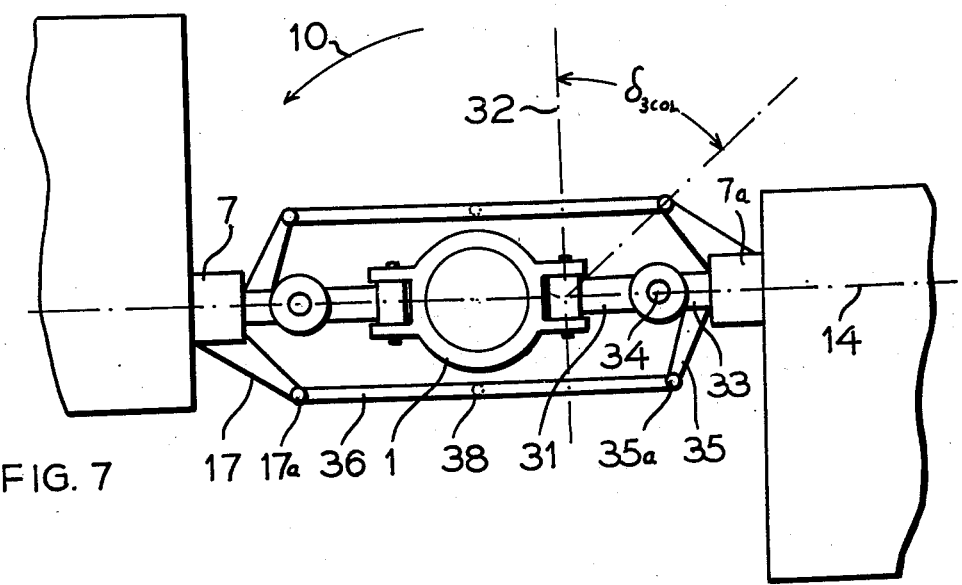
Fig. 7 is a plan view of the rotor hub and hinge assembly of a modified rotor embodying the invention.
Figure 8:
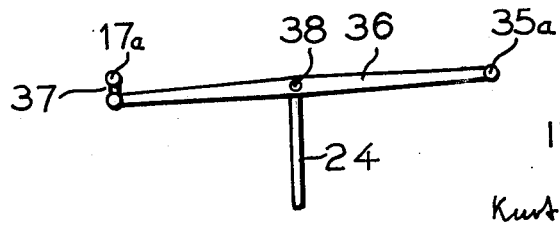
Fig. 8 is a side view of the walking beam of the rotor of Fig. 7.

Another embodiment of the invention is shown in Figs. 7 and 8. The inner links 31 are hinged to the rotating shaft 1 so as to allow a motion of the inner links 31 about the horizontal axis 32. The outer links 33 are hinged to the inner links 31 so as to allow horizontal motions of the outer links 33 about the vertical axis 34. The blades 7 are rotatably connected to the outer links 33 by means of a pitch varying pivot so that they may rotate about their longitudinal axis 14. Connected to the blades 7 are blade control horns 17, while a second pair of link control horns 35 is connected to the outer links 33. One end of the walking beam 36 is connected to the end point or point of attachment 35a of the link control horn 35. At its other end the walking beam 36 carries a vertical pushrod 37, the upper end of this pushrod being connected to the end point 17a of the blade control horn 17. The vertical pushrods 24, connected to the midpoint 38 of the walking beams 36 are, for the purpose of rotor control moved in the vertical direction. As in previous cases the rotor pitch control will be disregarded and it will be assumed that the points 38 are without vertical motion.

For a cyclic flapping motion opposite blades flap in opposite directions (see-saw motion). No change in blade pitch angle takes place for cyclic flapping because the walking beams 36 are free to participate in the see-saw motion. The axes 32 are the cyclic flapping axes for the blades and in the rotor of Fig. 7 cyclic flapping produces no change in blade pitch angle. By choosing for the push rods 24 a point of attachment 38 different from the midpoint of the walking beam 36, any desired coupling between cyclic flapping angle and blade pitch angle may be obtained. The walking beam 36 will also be referred to as a tip path plane follower because it tilts about its point of attack 38 by an angle proportional to the tilting angle of the blade tip path plane thereby rendering the blade pitch substantially non-responsive to cyclic blade flapping.

When the blades flap in unison and the controls are held fixed, there is an appreciable decrease of blade pitch angle with increased flapping angle. If the point 17a were vertically fixed, an increase in flapping angle $\Delta\beta_{col}$ of blade 7 would produce a decrease in blade pitch angle $\Delta\theta$ of $$\Delta\theta = \Delta\beta_{col} \tan \delta_{3\ col}$$

Actually, however, the point 17a is not vertically fixed.

When the blade 7a flaps upwardly by an angle $\Delta\beta_{col}$ it moves the end 35a of the walking beam 36 in the upward direction. Since the walking beam 36 is held in the midpoint 38 the other end 17a of the walking beam is moved in the downward direction thereby reducing the pitch angle of blade 7 by an amount equal to that indicated in the above equation. The total decrease in blade pitch angle produced by collective flapping, therefore, is:

$$\Delta\theta_{col} = 2\Delta\beta_{col} \tan \delta_{3\ col}$$

The rotor of Fig. 7 is shown with hinges with vertical axes 34 because this embodiment of the invention lends itself advantageously to the addition of such hinges. The modern development trend, however, is toward avoiding vertical hinges. In a two-bladed rotor the vertical hinges may be omitted if the rotor shaft is connected to the frame of the aircraft with sufficient elasticity to allow for horizontal motions of the hub, and it is assumed that in the cases shown in Fig. 5 and in Figs. 9 to 11 such provisions are made. In three and more bladed rotors the vertical hinges may be omitted if the rotor hub is of the freely floating type and tiltably connected to the shaft as in Fig. 6.

Figure 9:
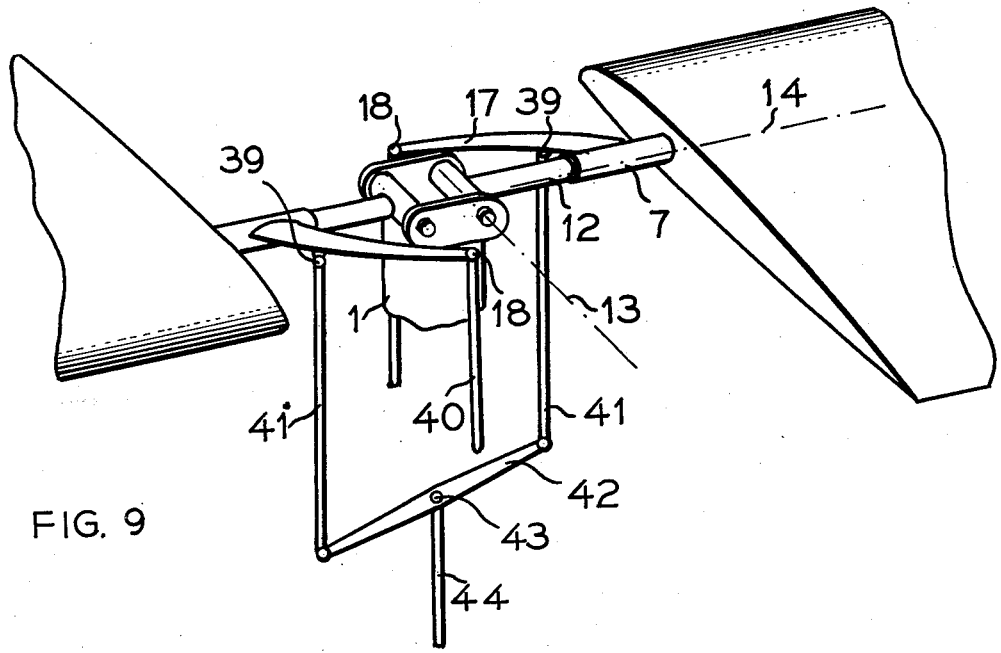
Fig. 9 is a perspective view, partly schematic, of the rotor hub and hinge assembly of a lifting rotor representing another embodiment of the invention.
Figure 10:
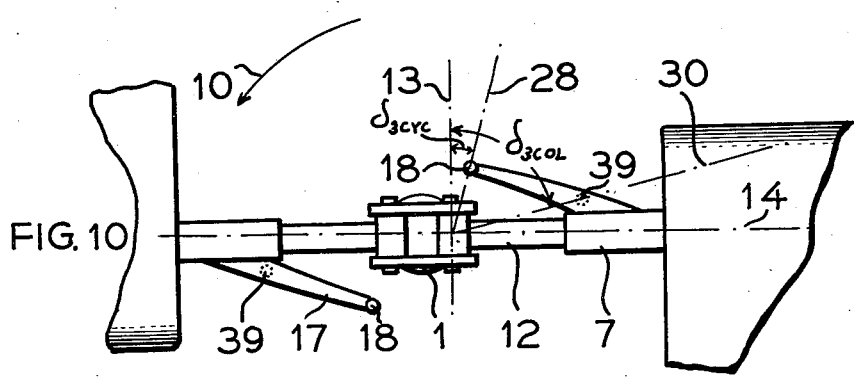
Fig. 10 is a plan view of the rotor hub and hinge assembly of Fig. 9.

Another embodiment of the invention is shown in Figs. 9 and 10. The links 12 are hinged to the rotor shaft 1 so as to rotate freely about the axes 13. The blades 7 are rotatably connected to the links 12 by means of pitch varying pivots so as to rotate about their longitudinal axes 14. The blades 7 carry control horns 17. At the end points 18 of the control horns 17 the vertical pushrods 40 are attached. Furthermore at the points 39 of the control horns 17 vertical push rods 41 are attached. The lower ends of the vertical pushrods 41 are connected by a crosshead 42 which is supported at its midpoint 43 by a vertical link 44. The vertical link 44 is for the purpose of collective blade pitch control, operated in a manner well known in the art and therefore not shown in the drawing. For a fixed position of the collective blade pitch control the point 43 is vertically fixed.

The vertical push rods 40 are, for the purpose of cyclic pitch control, also operated in a manner well known in the art, except that no restraint must exist which prevents a unison vertical motion of both push rods 40. For neutral position of the controls the straight line through the points 18 is horizontal but a free vertical motion of this line without angular displacement is possible.

For a cyclic flapping motion when opposite blades flap in opposite directions (see-saw motion) the cross head 42 participates in the motion and the push rods 41 move freely up and down without restraining the blades. The points 18, however, in a cyclic flapping motion are vertically fixed.

For a collective flapping motion, when both blades flap in unison, the pushrods 40 move freely up and down without restraining the blades. The points 39, however, in a collective flapping motion are vertically fixed.

The axis 28 through the center point of the axis 13 and through the point 18 on the control horns 17 is the cyclic flapping axis. The axis 28 is, according to the invention, located so that a change in cyclic flapping angle produces a change in blade pitch angle which is appreciably smaller than the cyclic flapping angle change.

The axis 30 through the center point of the axis 13 and through the point 39 on the control horn 17 is the collective flapping axis. The axis 30 is, according to the invention, located so that an increase in collective flapping angle produces a decrease in blade pitch angle which is appreciably larger than the collective flapping angle increase. The pushrods 40 and 41 will also be referred to as vertical control links. The cross head 42 will be referred to as a tip path plane follower because it tilts about its mid point 43 by an angle proportional to the tilting angle of the blade tip path plane thereby rendering the blade pitch substantially non-responsive to cyclic blade flapping.

Figure 11:
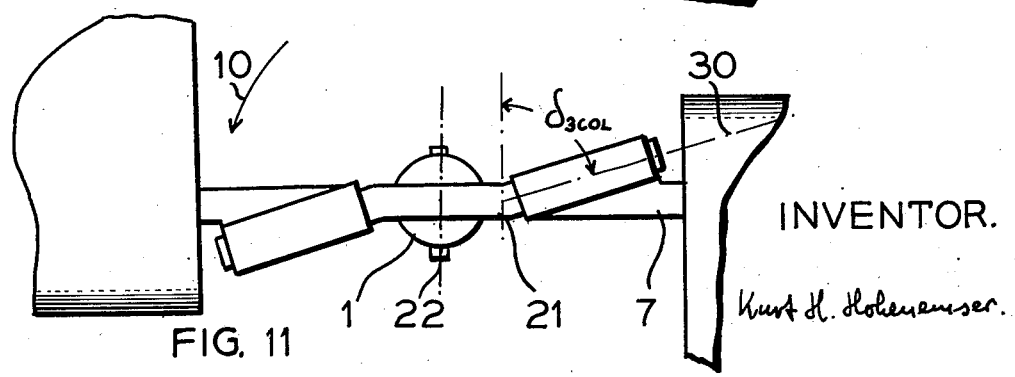
Fig. 11 is a plan view of the rotor hub and hinge assembly of a lifting rotor representing a further embodiment of the invention.

Fig. 11 illustrates another embodiment of the invention. The walking beam 21 is hinged to the rotor shaft so as to allow free see-saw motions about the axis 22. The blades 7 are rotatably connected to the walking beam 21 by means of a pitch varying pivot extending in the direction of the axis 30 so as to allow free motions about the axis 30. Cyclic flapping takes place about the axis 22 and no changes in blade pitch are produced by cyclic flapping motions. Collective flapping takes place about the axis 30, and an increase in collective flapping angle produces a decrease in blade pitch angle which is appreciably larger than the collective flapping angle increase. While the location of the axis 22, as drawn in Fig. 11, corresponds to a zero $\delta_{3\ cyc}$ angle, a moderate value of $\delta_{3\ cyc}$ of 15° to 30° is possible and desirable.

No means of rotor control are provided on the rotor of Fig. 11. An aircraft with a lifting rotor without rotor control must be maneuvered by separate means of control like auxiliary air screws which may not always be practical. The advantage of such an aircraft, however, lies in the very simple construction of the lifting rotor. In spite of this simplicity the rotor of Fig. 11 fulfills all the objects of the invention.

I wish it to be understood that the constructions I have described herein are shown by way of example and are not to be construed as the only manners of carrying out the invention. It is my intention to cover all modifications falling within the inventive concept as defined by the appended claims.

I claim:

1. In an aircraft having an aircraft body, a lifting rotor comprising a center portion connected to said aircraft body, a hub like member tiltably connected to said center portion, a plurality of blades, a flapping hinge for each of said blades connected to said hub like member, each of said blades being rotatably connected to its associated flapping hinge so as to allow rotation of said blades about their longitudinal axes, a control horn connected in trailing relation to each of said blades, and an actuating element for effecting positive pitch control attached to each control horn at a point of attachment on said control horn, the line determined by each point of attachment and the rotor center constituting a virtual cyclic flapping axis and the line determined by each point of attachment and the center of the associated flapping hinge constituting a virtual collective flapping axis, each of said virtual cyclic flapping axes forming an angle greater than 45° with the longitudinal axis of its associated blade when said blade is radially disposed, and each of said virtual collective flapping axes forming an angle less than 45° with the longitudinal axis of its associated blade when said longitudinal axis is radially disposed, said angles being measured from the longitudinal axis of each blade in the direction of rotation of the rotor.

2. In an aircraft having an aircraft body, a lifting rotor comprising a center portion connected to said aircraft body, a plurality of blades, a flapping hinge for each of said blades connected to said center portion, each of said blades being rotatably connected to its associated flapping hinge so as to allow rotation of said blades about their longitudinal axes, a control horn connected to each of said blades, each having a point of attachment for cyclic pitch control only and defining a virtual cyclic flapping axis through said point of attachment and through the center of its associated flapping hinge, each of said control horns having a second point of attachment for collective pitch control only and defining a virtual collective flapping axis through said second point of attachment and through the center of its associated flapping hinge, an actuating element connected to each of said horns at second point of attachment, a tip path plane following element tiltable about a pivot intersecting the axis of said center portion and interconnecting said actuating elements, each of said virtual cyclic flapping axes forming an angle greater than 45 degrees with the longitudinal axis of its associated blade when said blade is radially disposed, and each of said virtual collective flapping axes forming an angle less than 45 degrees with the longitudinal axis of its associated blade when said longitudinal axis is radially disposed, said angles being measured from the longitudinal axis of each blade in the direction of rotation of the rotor.

3. In an aircraft having an aircraft body, a lifting rotor comprising a center portion rotatably connected to said aircraft body, a plurality of blades, a hinge mechanism for each of said blades effectively connecting said blades to said center portion to permit flapping motion of said blades and to permit rotation of said blades substantially about their longitudinal blade axis, a blade pitch control horn connected to each of said blades having a point of attachment for collective pitch control only and a second point of attachment for cyclic pitch control only, collective pitch control links connected to the first point of attachment of said pitch control horn and being unrestrained in their cyclic motion, and cyclic pitch control links connected to the second point of attachment of said pitch control horn and being unrestrained in their collective motion, a tip path plane following element tiltable about a pivot intersecting the axis of said center portion and interconnecting said collective pitch control links, said hinge mechanism and said points of attachment defining an effective substantially horizontal collective flapping axis and an effective substantially horizontal cyclic flapping axis for each of said blades, said collective flapping axis passing through the center of said hinge mechanism and through said first point of attachment of said pitch control horn and extending outwardly when seen in the direction of rotation of its associate blade, and said cyclic flapping axis passing through the center of said hinge mechanism and through said second point of attachment of said pitch control horn and extending substantially in the direction of rotation of the blade, each of said effective cyclic flapping axes forming substantially a right angle with the longitudinal axis of its associated blade, and each of said effective collective flapping axes forming an acute angle with the longitudinal axis of its associated blade when said longitudinal axis is radially disposed, said angles being measured from the longitudinal axis of each blade in the direction of rotation of the rotor, whereby the blade pitch is made substantially responsive to collective blade flapping only and substantially non-responsive to cyclic blade flapping.

4. In an aircraft having an aircraft body, a lifting rotor comprising a center portion connected to said aircraft body, a hub like member tiltably connected to said center portion, a plurality of outer flapping hinges connected to said hub like member, a blade rotatably connected to each of said outer flapping hinges so as to allow rotation of said blades about their longitudinal axes, a control horn connected to each of said blades, and an actuating element for effecting positive pitch control attached to each control horn at a point of attachment on said control horn, the line determined by each point of attachment and the rotor center constituting a virtual cyclic flapping axis and the line determined by each point of attachment and the center of the associated flapping hinge constituting a virtual collective flapping axis, each of said virtual cyclic flapping axes forming an angle greater than 45° with the longitudinal axis of its associated blade when said blade is radially disposed, and each of said virtual collective flapping axes forming an angle less than 45° with the longitudinal axis of its associated blade when said lonigtudinal axis is radially disposed, said angles being measured from the longitudinal axis of each blade in the direction of rotation of the rotor.

5. In an aircraft having an aircraft body, a lifting rotor comprising a center portion connected to said aircraft body, a hub like member tiltably connected to said center portion, a plurality of outer flapping hinges connected to said hub like member, a blade rotatably connected to each of said outer flapping hinges so as to allow rotation of said blades about their longitudinal axes, a control horn connected in trailing relation to each of said blades, and an actuating element for effecting positive pitch control attached to each control horn at a point of attachment on said control horn, the line determined by each point of attachment and the rotor center constituting a virtual cyclic flapping axis and the line determined by each point of attachment and the center of the associated flapping hinge constituting a virtual collective flapping axis, each of said virtual cyclic flapping axes forming substantially a right angle with the longitudinal axis of its associated blade when said blade is radially disposed, and each of said virtual collective flapping axes forming an acute angle with the longitudinal axis of its associated blade when said longitudinal axis is radially disposed, said angles being measured from the longitudinal axis of each blade in the direction of rotation of the rotor, whereby the blade pitch is made substantially responsive to collective blade flapping only and substantially non-responsive to cyclic blade flapping.

6. In an aircraft having an aircraft body, a lifting rotor comprising a center portion connected to said aircraft body, a plurality of blades, flapping and pitch varying mechanism effectively connecting said blades to said center portion, a flapping hinge for each of said blades and included in said mechanism, each of said blades being rotatably connected to its associated flapping hinge so as to allow rotation of said blades about their longitudinal axes, a control horn included in said mechanism and connected to each of said blades, actuating links for effecting pitch control included in said mechanism and attached to said control horns, a tip path plane following element included in said mechanism and interconnecting said blades with each other and tiltable about a pivot intersecting the axis of said center portion, said element and said blades performing together cyclic flapping motions substantially without changing the pitch of said blades, said mechanism rendering the blade pitch responsive to collective blade flapping with respect to the plane of said element, whereby an increase in collective blade flapping angle produces a decrease in collective blade pitch angle which is larger than the increase of said collective blade flapping angle.

7. In an aircraft having an aircraft body, a lifting rotor comprising a center portion connected to said aircraft body, a hub like member, a central hinge mechanism connecting said hub like member with said center portion to permit tilting motions of said hub like member, a plurality of blades, outer flapping and pitch varying mechanism for each blade effectively connecting it to said hub like member, said outer flapping and pitch varying mechanism including an outer hinge for each of said blades permitting each blade to flap with respect to said hub like member, a pitch varying pivot for each of said blades permitting each blade to rotate substantially about its longitudinal axis, a pitch control horn connected to each blade having a point of attachment for pitch control, the line determined by each point of attachment and the center of said central hinge mechanism constituting a virtual cyclic flapping axis and the line determined by each point of attachment and the center of said outer hinge constituting a virtual collective flapping axis, each of said virtual cyclic flapping axes forming substantially a right angle with the longitudinal axis of its associated blade, and each of said virtual collective flapping axes forming an acute angle with the longitudinal axis of its associated blade when said longitudinal axis is radially disposed, said angles being measured from the longitudinal axis of each blade in the direction of rotation of the rotor, said hub like member and said blades performing together cyclic flapping motions substantially without changing the pitch of said blades, said outer flapping and pitch varying mechanism rendering the blade pitch responsive to collective blade flapping with respect to the plane of said hub like member.

KURT H. HOHENEMSER.

References Cited in the file of this patent

UNITED STATES PATENTS

| Number | Name | Date |
|---|---|---|
| 2,045,355 | Hays | June 23, 1936 |
| 2,086,802 | Hays | July 13, 1937 |
| 2,192,492 | Bennett | Mar. 5, 1940 |
| 2,397,154 | Platt | Mar. 26, 1946 |
| 2,429,646 | Pullin | Oct. 28, 1947 |

FOREIGN PATENTS

| Number | Country | Date |
|---|---|---|
| 476,596 | Great Britain | Dec. 13, 1937 |

OTHER REFERENCES

Ser. No. 254,867, Flettner (A. P. C.), published May 25, 1943.